US012583609B2

(12) United States Patent
Menheere

(10) Patent No.: US 12,583,609 B2
(45) Date of Patent: Mar. 24, 2026

(54) EXHAUST DUCT FOR HYBRID AIRCRAFT POWERPLANT

(71) Applicant: Pratt & Whitney Canada Corp., Longueuil (CA)

(72) Inventor: David Menheere, Norval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 258 days.

(21) Appl. No.: 18/088,214

(22) Filed: Dec. 23, 2022

(65) Prior Publication Data
US 2024/0208664 A1 Jun. 27, 2024

(51) Int. Cl.
| | |
|---|---|
| *B64D 27/10* | (2006.01) |
| *B64D 27/02* | (2006.01) |
| *B64D 27/24* | (2024.01) |
| *B64D 33/04* | (2006.01) |
| *B64D 35/024* | (2025.01) |

(Continued)

(52) U.S. Cl.
CPC ........... *B64D 35/024* (2024.01); *B64D 27/10* (2013.01); *B64D 27/24* (2013.01); *B64D 33/04* (2013.01); *B64D 35/08* (2013.01); *F01D 15/10* (2013.01); *F02C 3/04* (2013.01); *F02C 6/00* (2013.01); *F02C 6/206* (2013.01); *F02C 7/36* (2013.01); *F02K 1/40* (2013.01); *F02K 1/52* (2013.01); *F02K 5/00* (2013.01); *H02K 7/116* (2013.01); *H02K 7/1823* (2013.01); *B64D 27/026* (2024.01); *B64D 33/06* (2013.01); *F01D 25/30* (2013.01); *F05D 2220/324* (2013.01); *F05D 2220/76* (2013.01); *F05D 2250/314* (2013.01)

(58) Field of Classification Search
CPC ...... B64D 27/026; B64D 27/10; B64D 27/24; B64D 35/08; B64D 33/04–06; B64D 35/024; F01D 15/10; F01D 25/30; F02C 3/04; F02C 6/00; F02C 6/206; F02C 7/36; F02K 1/40; F02K 1/52; F02K 5/00; F05D 2220/324; F05D 2220/76; F05D 2250/314; H02K 7/116; H02K 7/1823
See application file for complete search history.

(56) References Cited

U.S. PATENT DOCUMENTS

| | | | |
|---|---|---|---|
| 8,317,129 | B1 | 11/2012 | Lawson |
| 10,267,263 | B2 | 4/2019 | Lord |

(Continued)

OTHER PUBLICATIONS

EP Search Report for EP Patent Application No. 23219440.7 dated Apr. 24, 2024.

*Primary Examiner* — Jason H Duger
(74) *Attorney, Agent, or Firm* — Getz Balich LLC

(57) ABSTRACT
An aircraft system is provided that includes a propulsor rotor, an electric machine and a gas turbine engine. The electric machine is operatively coupled to and configured to drive rotation of the propulsor rotor. The gas turbine engine is operatively coupled to and configured to drive rotation of the propulsor rotor. The gas turbine engine includes a compressor section, a combustor section, a turbine section, an exhaust duct and a flowpath extending through the compressor section, the combustor section, the turbine section and the exhaust duct. The exhaust duct extends longitudinally along the electric machine. The exhaust duct extends partially circumferentially about the electric machine between opposing circumferential sides of the exhaust duct.

19 Claims, 7 Drawing Sheets

(51) Int. Cl.

| | | |
|---|---|---|
| *B64D 35/08* | (2025.01) | |
| *F01D 15/10* | (2006.01) | |
| *F01D 25/30* | (2006.01) | |
| *F02C 3/04* | (2006.01) | |
| *F02C 6/00* | (2006.01) | |
| *F02C 6/20* | (2006.01) | |
| *F02C 7/36* | (2006.01) | |
| *F02K 1/40* | (2006.01) | |
| *F02K 1/52* | (2006.01) | |
| *F02K 5/00* | (2006.01) | |
| *H02K 7/116* | (2006.01) | |
| *H02K 7/18* | (2006.01) | |

(56) References Cited

U.S. PATENT DOCUMENTS

| | | | |
|---|---|---|---|
| 10,717,539 B2 | 7/2020 | Menheere | |
| 12,246,844 B1* | 3/2025 | Weaver | F01D 15/10 |
| 2010/0170220 A1* | 7/2010 | Kohlenberg | F02K 1/06 |
| | | | 60/226.3 |
| 2014/0250860 A1* | 9/2014 | Sidelkovskiy | F01D 15/10 |
| | | | 60/39.15 |
| 2018/0051627 A1 | 2/2018 | Chandler | |
| 2019/0085715 A1 | 3/2019 | Van Der Merwe | |
| 2021/0010382 A1 | 1/2021 | Davies | |
| 2021/0010383 A1 | 1/2021 | Bradley | |
| 2021/0010384 A1 | 1/2021 | Bradley | |
| 2021/0079850 A1 | 3/2021 | Davies | |
| 2022/0302801 A1 | 9/2022 | Osama | |
| 2024/0209775 A1* | 6/2024 | O'Connor | F02K 3/06 |
| 2025/0263173 A1* | 8/2025 | Weaver | B64D 27/40 |
| 2025/0297579 A1* | 9/2025 | Morton | F02C 3/04 |

* cited by examiner

EXHAUST DUCT FOR HYBRID AIRCRAFT POWERPLANT

TECHNICAL FIELD

This disclosure relates generally to an aircraft and, more particularly, to a hybrid powerplant for the aircraft.

BACKGROUND INFORMATION

A hybrid powerplant for an aircraft may include a gas turbine engine and an electric motor. The gas turbine engine and the electric motor may be operatively connected in parallel through a gearbox or inline through a shaft and/or another coupling. Various types and configurations of hybrid powerplants are known in the art. While these known hybrid powerplants have various benefits, there is still room in the art for improvement.

SUMMARY

According to an aspect of the present disclosure, an aircraft system is provided that includes a propulsor rotor, an electric machine and a gas turbine engine. The electric machine is operatively coupled to and configured to drive rotation of the propulsor rotor. The gas turbine engine is operatively coupled to and configured to drive rotation of the propulsor rotor. The gas turbine engine includes a compressor section, a combustor section, a turbine section, an exhaust duct and a flowpath extending through the compressor section, the combustor section, the turbine section and the exhaust duct. The exhaust duct extends longitudinally along the electric machine. The exhaust duct extends partially circumferentially about the electric machine between opposing circumferential sides of the exhaust duct.

According to another aspect of the present disclosure, another aircraft system is provided that includes an electric machine and a gas turbine engine. The electric machine includes an electric machine rotor. The gas turbine engine includes a rotating structure, a compressor section, a combustor section, a turbine section, an exhaust duct and a flowpath extending through the compressor section, the combustor section, the turbine section and the exhaust duct. The rotating structure includes a turbine rotor within the turbine section. The rotating structure is rotatable with and coupled to the electric machine rotor. The exhaust duct is wrapped partially circumferentially around the electric machine.

According to still another aspect of the present disclosure, another aircraft system is provided that includes an electric machine, a gas turbine engine and one or more service lines. The electric machine includes an electric machine rotor. The gas turbine engine includes a rotating structure, a compressor section, a combustor section, a turbine section, an exhaust duct and a flowpath extending through the compressor section, the combustor section, the turbine section and the exhaust duct. The rotating structure includes a turbine rotor within the turbine section. The rotating structure is rotatable with and coupled to the electric machine rotor. The exhaust duct extends longitudinally along the electric machine. The one or more service lines are routed to the electric machine without passing through the exhaust duct or across the flowpath.

The exhaust duct may extend circumferentially around the electric machine less than two-hundred and seventy degrees.

At least a section of the exhaust duct may wrap between thirty degrees and two-hundred and seventy degrees circumferentially around the electric machine. The section of the exhaust duct may longitudinally overlap the electric machine.

The aircraft system may also include a propulsor rotor rotatable with and coupled to the electric machine rotor through the rotating structure.

An inlet to the exhaust duct may have an annular geometry. The outlet from the exhaust duct may have a non-annular geometry.

The non-annular geometry may be an arcuate geometry.

The non-annular geometry may have a crescent shape.

An inlet section of the exhaust duct may extend circumferentially around a longitudinal centerline. The inlet section of the exhaust duct may be located longitudinally between the turbine section and the electric machine.

The exhaust duct may include a first section and a second section downstream of the first section. The first section may extend a first number of degrees about the electric machine between the opposing circumferential sides of the exhaust duct. The second section may extend a second number of degrees about the electric machine between the opposing circumferential sides of the exhaust duct. The second number of degrees may be less than the first number of degrees.

The first number of degrees may be between one-hundred and sixty degrees and two-hundred degrees. The second number of degrees may be between forty-five degrees and one-hundred and twenty degrees.

The exhaust duct may extend a number of degrees circumferentially about the electric machine between the opposing circumferential sides of the exhaust duct. The number of degrees may be between thirty degrees and two-hundred and seventy degrees.

The aircraft system may also include one or more service lines routed to the electric machine without passing through the exhaust duct.

A rotational axis of the electric machine may be coaxial with a rotational axis of the gas turbine engine.

The gas turbine engine may also include a rotating structure rotatable with and coupled to the propulsor rotor. The electric machine may include an electric machine rotor rotatable with and coupled to the propulsor rotor through the rotating structure.

The rotating structure may include a turbine rotor arranged within the turbine section.

The aircraft system may also include a geartrain coupling the rotating structure to the propulsor rotor.

The electric machine may be configurable as an electric motor during a motor mode of operation to drive rotation of the propulsor rotor. The electric machine may also be configurable as an electric generator during a generator mode of operation where the gas turbine engine is configured to drive rotation of an electric machine rotor within the electric machine.

The propulsor rotor may be configured as or otherwise include a propeller rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
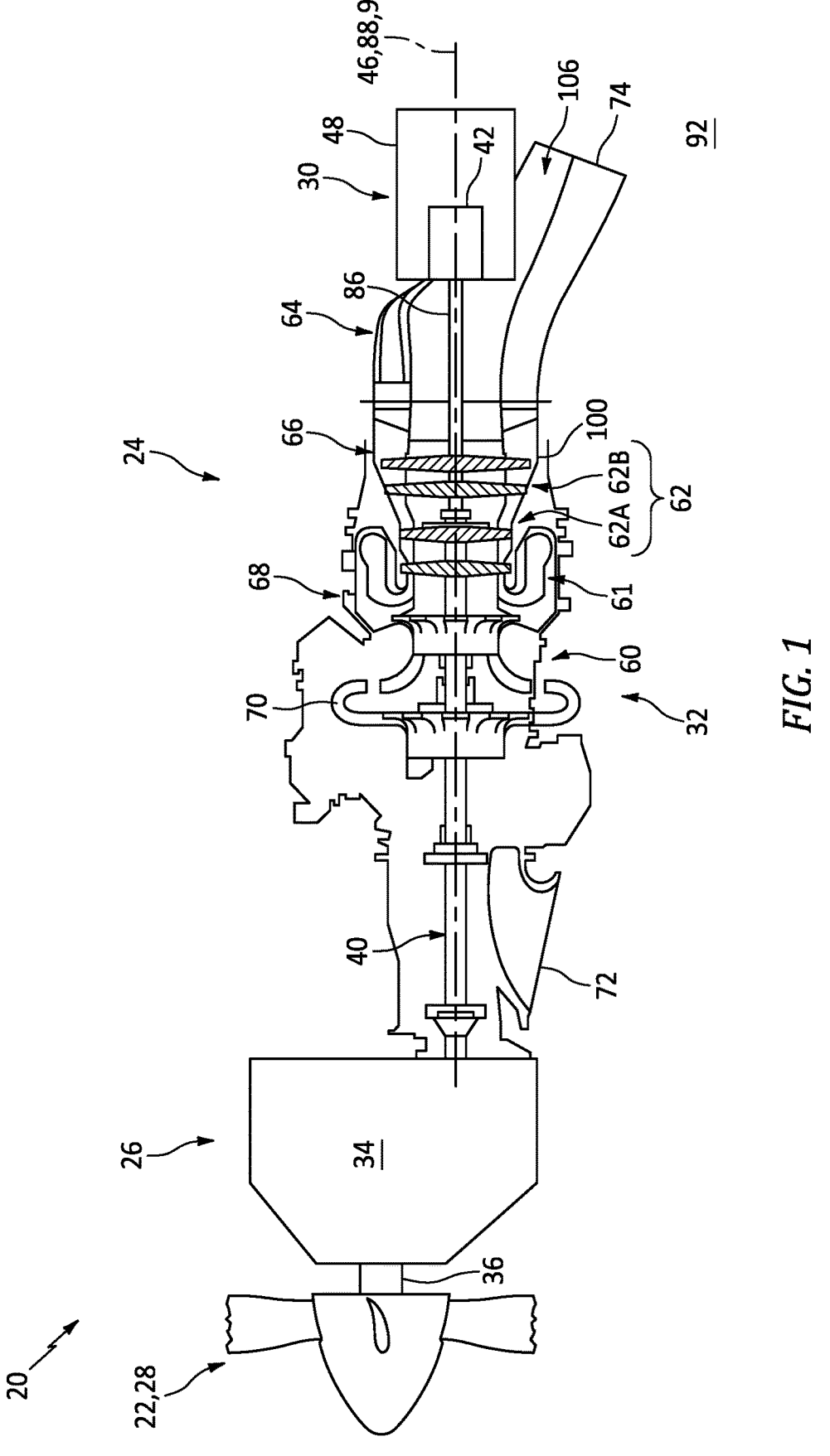
FIG. 1 is a partial schematic sectional illustration of an aircraft system.

FIG. 1 illustrates a system 20 for an aircraft such as an airplane. This aircraft system 20 may be configured as or otherwise include a propulsion system for the aircraft. The aircraft system 20 of FIG. 1, for example, includes a propulsor rotor 22 and a hybrid powerplant 24. The aircraft system 20 of FIG. 1 also includes a drivetrain 26 operatively connecting the powerplant 24 to the propulsor rotor 22.

The propulsor rotor 22 may be configured as or otherwise include a bladed rotor. This propulsor rotor 22 may be an open rotor (e.g., an un-ducted rotor) such as a propeller rotor 28 for a propeller propulsion system; e.g., a hybrid turbo-prop engine. Other examples of the open rotor include a propulsor rotor for a propfan propulsion system or a propulsor rotor for a pusher fan propulsion system. The present disclosure, however, is not limited to such exemplary open rotors nor to open rotor propulsion systems. The propulsor rotor 22, for example, may alternatively be a ducted rotor such as a fan rotor (e.g., a fan) for a turbofan propulsion system; e.g., a hybrid turbofan engine. It is further contemplated the propulsor rotor 22 may be configured as another type of air mover. However, for ease of description, the propulsor rotor 22 may be described and/or referred to herein as the propeller rotor 28.

The powerplant 24 includes an electric machine 30 and a gas turbine engine 32. The powerplant 24 is configured to drive rotation of the propulsor rotor 22, using the electric machine 30 and/or the gas turbine engine 32, through the drivetrain 26. This drivetrain 26 may be configured as a geared drivetrain. The drivetrain 26 of FIG. 1, for example, includes a geartrain 34 (e.g., a reduction gear system) and a shaft 36 and/or another power transmission device coupling an output of the geartrain 34 to the propulsor rotor 22. The present disclosure, however, is not limited to such an exemplary geared drivetrain arrangement. Furthermore, in other embodiments, the geartrain 34 may be omitted from the drivetrain 26 to provide a direct drive drivetrain between the powerplant 24 and the propulsor rotor 22.

Figure 2:
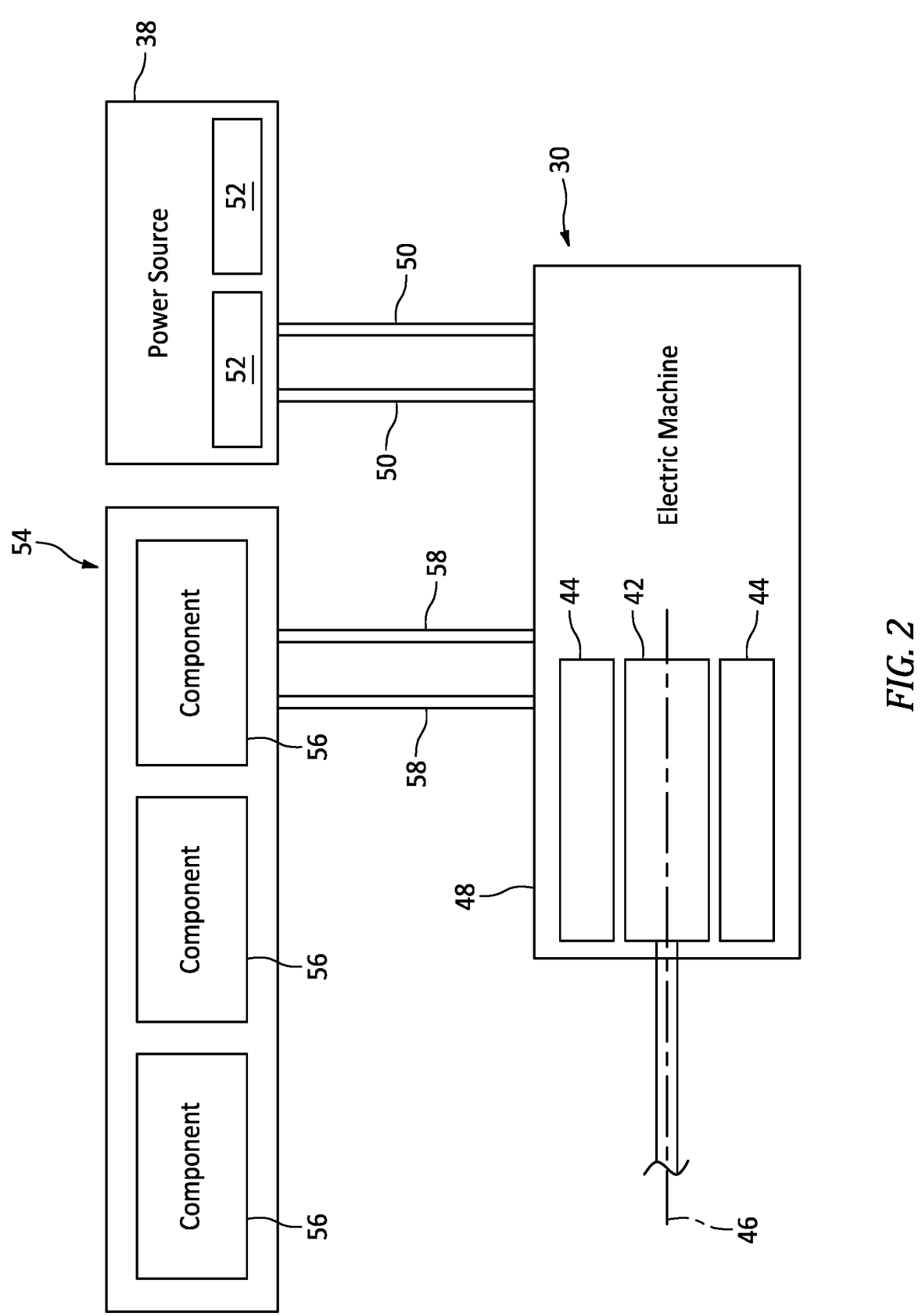
FIG. 2 is a schematic illustration of an electric machine arranged with a power source and a fluid system.

Referring to FIG. 2, the electric machine 30 may be configurable as an electric motor and/or an electric generator. For example, during a motor mode of operation, the electric machine 30 may operate as the electric motor to convert electricity received from a power source 38 into mechanical power. This mechanical power may be utilized for various purposes within the aircraft system 20 of FIG. 1 such as, for example, rotating the propulsor rotor 22 and/or rotating a low speed rotating structure 40 (or another rotating structure) within the gas turbine engine 32 during engine startup. During a generator mode of operation, the electric machine 30 may operate as the electric generator to convert mechanical power received from, for example, the gas turbine engine 32 and its low speed rotating structure 40 into electricity. This electricity may be utilized for various purposes within the aircraft system 20 such as, for example, electrically powering one or more electric components of the aircraft system 20 and/or charging the power source 38 (see FIG. 2). The electricity may also or alternatively be utilized for various purposes outside of the aircraft system 20 such as, for example, electrically powering one or more electric components in the aircraft. Of course, in other embodiments, the electric machine 30 may alternatively be configured as a dedicated electric motor; e.g., without the electric generator functionality.

The electric machine 30 of FIG. 2 includes an electric machine rotor 42 and an (e.g., annular) electric machine stator 44. The machine stator 44 may be radially outboard of and circumscribe the machine rotor 42. The electric machine 30, however, is not limited to such an exemplary rotor-stator configuration. The machine rotor 42, for example, may alternatively be axially next to or radially outboard of and circumscribe the machine stator 44. The machine rotor 42 of FIG. 2 is rotatable about a rotational axis 46 of the machine rotor 42, which rotational axis 46 may also be an axial centerline of the electric machine 30. The electric machine 30 also includes an electric machine case 48 that at least partially or completely houses the machine rotor 42 and the machine stator 44.

The power source 38 is electrically coupled with the electric machine 30 through one or more electrical leads 50; e.g., high voltage lines. The power source 38 is configured to store electricity. The power source 38 is also configured to provide the stored electricity to the electric machine 30 and/or receive electricity from the electric machine 30; e.g., during power source recharging. The power source 38, for example, may be configured as or otherwise include one or more batteries 52 and/or one or more other electric storage devices.

The electric machine 30 may also be fluidly coupled to a fluid system 54. This fluid system 54 may be configured to lubricate and/or cool one or more internal components of the electric machine 30. Examples of the internal components include, but are not limited to, the machine rotor 42, the machine stator 44, one or more bearings rotatably supporting the machine rotor 42 and/or a heat exchanger. The fluid system 54 of FIG. 2 includes one or more system components 56 and one or more fluid conduits 58; e.g., pipes, hoses, etc. Examples of the system components 56 include, but are not limited to, a fluid reservoir (e.g., a lubricant and/or coolant tank, etc.), a heat exchanger, a filter, a pump and a valve. The system components 56 are fluidly coupled with the electric machine 30 and its internal component(s) through the fluid conduit(s) 58 in, for example, an open or a closed look circuit.

Figure 3:
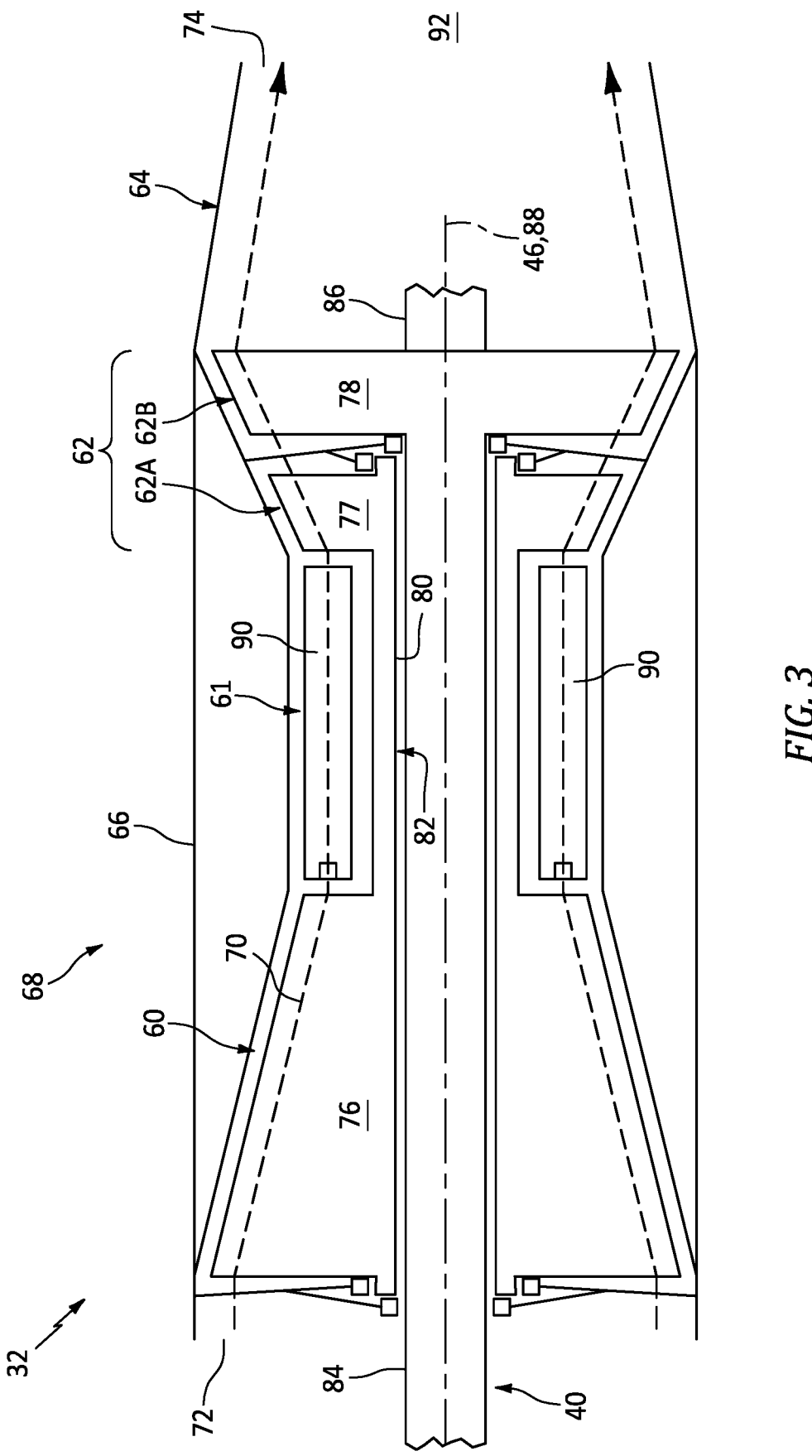
FIG. 3 is a schematic illustration of a gas turbine engine.

Referring to FIG. 3, the gas turbine engine 32 includes a compressor section 60, a combustor section 61, a turbine section 62 and an (e.g., axisymmetric) exhaust duct 64. The turbine section 62 may include a high pressure turbine (HPT) section 62A and a low pressure turbine (LPT) section 62B; e.g., a power turbine section. The gas turbine engine 32 also includes an engine case 66 housing the engine sections 60-62B; e.g., a core 68 of the gas turbine engine 32.

The compressor section 60, the combustor section 61, the HPT section 62A, the LPT section 62B and the exhaust duct 64 are arranged sequentially along a core flowpath 70 within the gas turbine engine 32. This flowpath 70 extends within the gas turbine engine 32 from an upstream airflow inlet 72 into the gas turbine engine 32 to a downstream combustion products exhaust 74 from the gas turbine engine 32.

Each of the engine sections 60, 62A and 62B includes a respective bladed rotor 76-78. Each of these bladed rotors 76-78 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 76 is connected to the HPT rotor 77 through a high speed shaft 80. At least the compressor rotor 76, the HPT rotor 77 and the high speed shaft 80 may collectively form a high speed rotating structure 82 of the gas turbine engine 32. The LPT rotor 78 is connected to a low speed shaft 84, which low speed shaft 84 may extend axially through a bore of the high speed rotating structure 82 and its high speed shaft 80. At least the LPT rotor 78 and the low speed shaft 84 may collectively form the low speed rotating structure 40. This low speed rotating structure 40 may be coupled to and rotatable with the propulsor rotor 22 of FIG. 1 through the drivetrain 26 and its member(s) 34 and/or 36. The low speed rotating structure 40 of FIG. 1 may also be coupled to and rotatable with the machine rotor 42 through a shaft 86 and/or another power transmission device. With such an arrangement, the machine rotor 42 of FIG. 1 is coupled to the propulsor rotor 22 through the low speed rotating structure 40, and more particularly sequentially through the shaft 86, the low speed rotating structure 40 and the drivetrain 26 of FIG. 1. The present disclosure, however, is not limited to such an exemplary operative connection between the electric machine 30 and the propulsor rotor 22.

The rotating structures 82 and 40 and their shafts 80 and 84 of FIG. 3 are supported by a plurality of bearings. Each of these bearings is connected to the engine case 66 by one or more support structures; e.g., struts, frames, etc. With this arrangement, each of the rotating structures 82 and 40 of FIG. 3 is rotatable about a common (or respective) rotational axis 88, which rotational axis 88 may also be an axial centerline of the respective rotating structure 82, 40. In some embodiments, referring to FIG. 1, the rotational axis 88 may be coaxial with or at least substantially parallel with (e.g., within +/−2° or 5° of) the rotational axis 46 of the machine rotor 42. The electric machine 30 of FIG. 1 may thereby be (e.g., completely or substantially) radially aligned with, but aft and/or downstream of the engine core 68. Here, the exhaust duct 64 is aft and/or downstream of the engine core 68.

Referring again to FIG. 3, during gas turbine engine operation, air enters the flowpath 70 through the airflow inlet 72 and is directed into the compressor section 60. The air within the flowpath 70 may be referred to as "core air". This core air is compressed by the compressor rotor 76 and directed into a combustion chamber 90 (e.g., an annular chamber) of a combustor within the combustor section 61. The fuel is injected into the combustion chamber 90 by one or more fuel injectors and mixed with the compressed air to provide a fuel-air mixture. This fuel-air mixture is ignited and combustion products thereof flow through and sequentially cause the HPT rotor 77 and the LPT rotor 78 to rotate. The rotation of the HPT rotor 77 drives rotation of the compressor rotor 76 and, thus, compression of the air received from the airflow inlet 72. The rotation of the LPT rotor 78 and, more generally, the low speed rotating structure 40 provides mechanical power for driving (e.g., rotating) the propulsor rotor 22 of FIG. 1. The present disclosure, however, is not limited to such an exemplary gas turbine engine configuration. For example, in other embodiments, the low speed rotating structure 40 may also include a compressor rotor. In still other embodiments, the low speed rotating structure 40 may be omitted and the high speed rotating structure 82 may be configured for providing the mechanical power for driving the propulsor rotor 22 of FIG. 1. In such embodiments, the electric machine 30 and its machine rotor 42 may be coupled to the propulsor rotor 22 through the high speed rotating structure 82. Referring again to FIG. 3, after flowing through the turbine section 62, the combustion products flow through the exhaust duct 64 and are exhausted from the powerplant 24 through the combustion products exhaust 74 into an environment 92 external to the aircraft system 20; see also FIG. 1.

Figure 4:
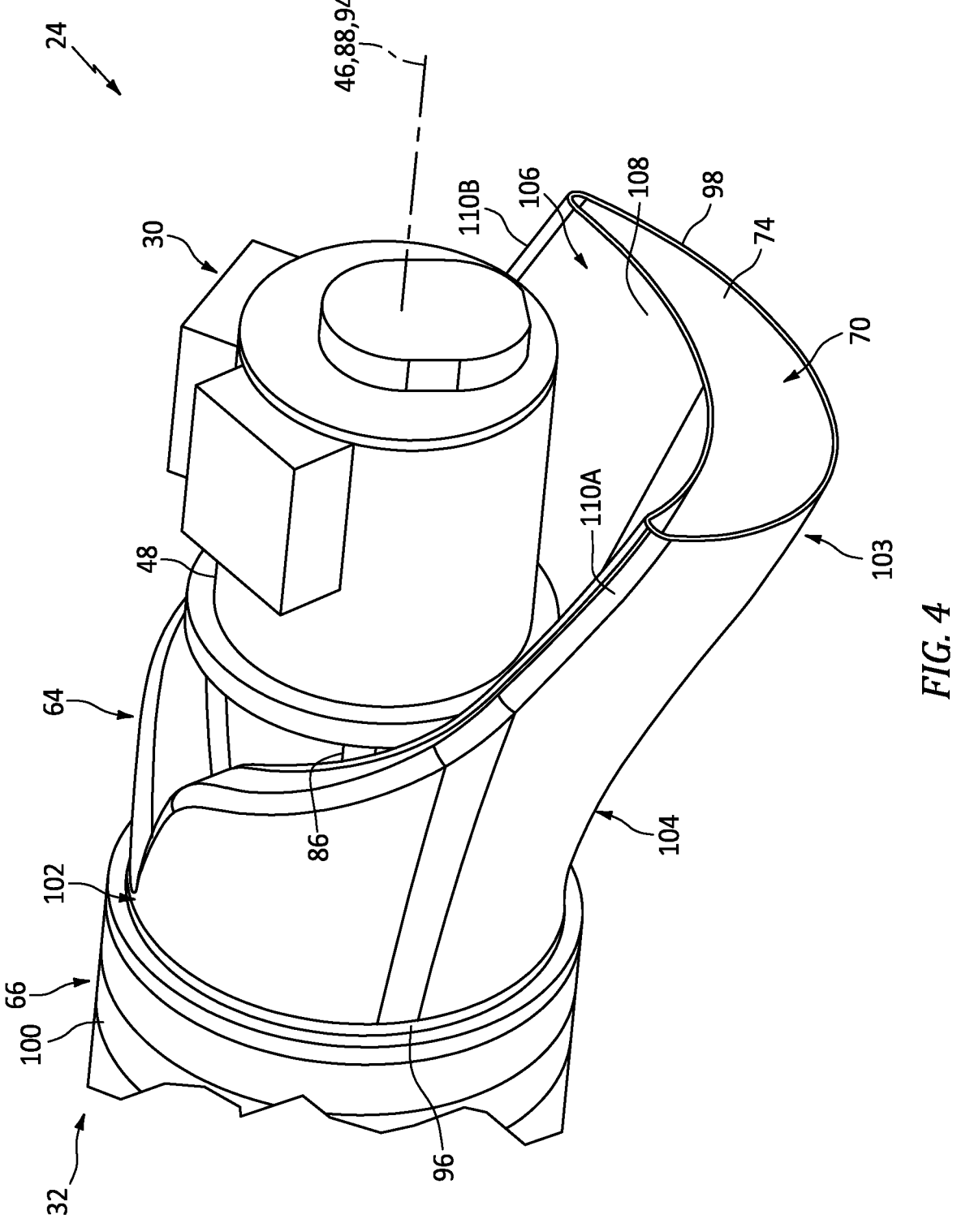
FIG. 4 is a perspective illustration of a portion of a powerplant with the electric machine and an exhaust duct of the gas turbine engine.
Figure 5:
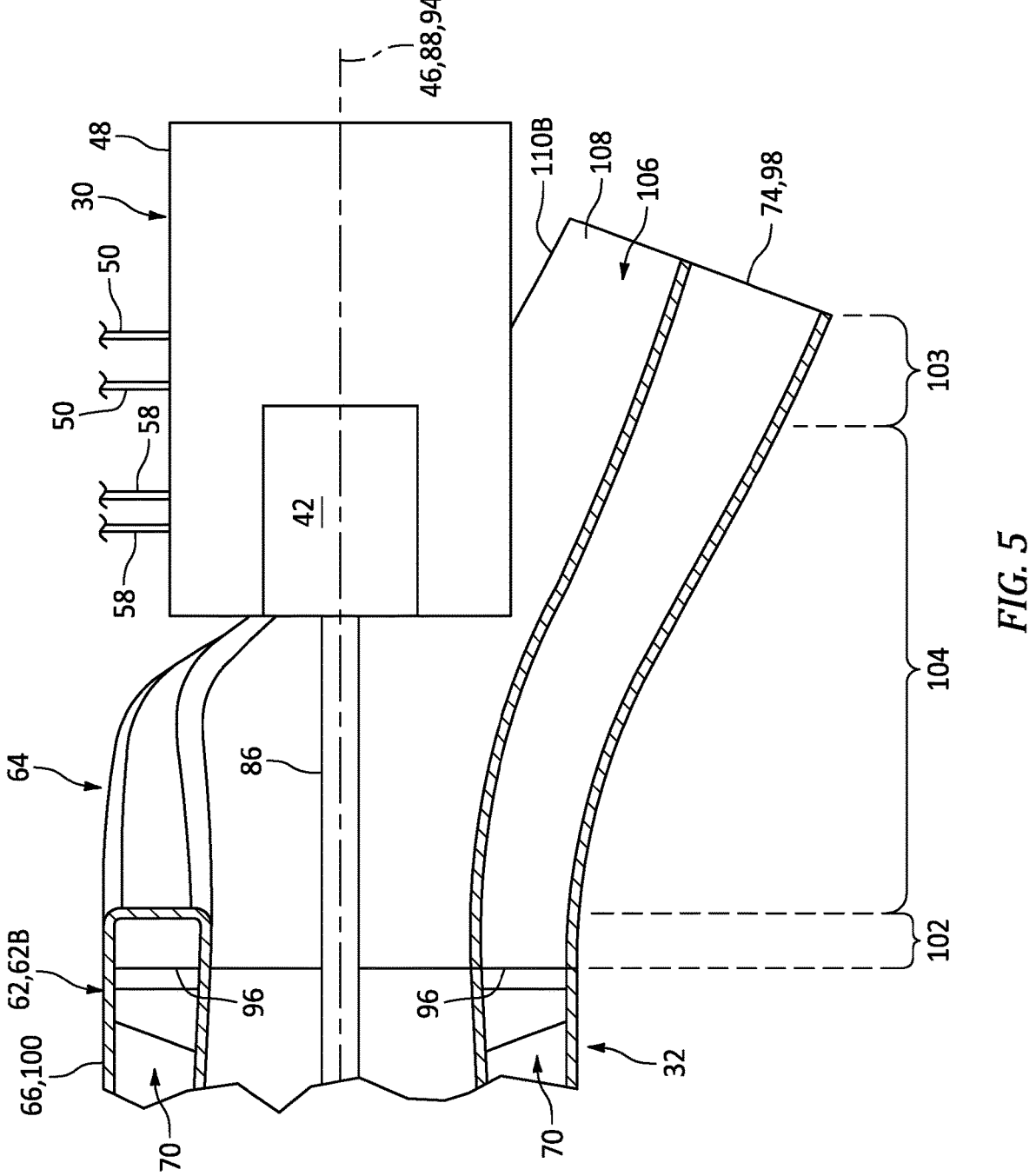
FIG. 5 is a sectional illustration of a portion of the powerplant with the electric machine (schematically shown) and the exhaust duct.

Referring to FIGS. 4 and 5, the exhaust duct 64 is located at an aft and/or downstream end of the gas turbine engine 32. The exhaust duct 64 of FIGS. 4 and 5, for example, extends longitudinally along a longitudinal centerline 94 between and to an inlet 96 to the exhaust duct 64 and an outlet 98 from the exhaust duct 64, which longitudinal centerline 94 may be coaxial with one or more of the rotational axes 46 and/or 88; see also FIG. 1. The exhaust duct 64 is connected to the engine case 66. The exhaust duct 64 of FIG. 5, for example, is mechanically fastened to an aft and/or downstream portion 100 of the engine case 66 housing the turbine section 62 at the duct inlet 96. The duct outlet 98 forms the combustion products exhaust 74. The exhaust duct 64 thereby projects longitudinally out from the turbine section portion 100 of the engine case 66 to the combustion products exhaust 74. The exhaust duct 64 includes an inlet section 102, an outlet section 103 and a transition section 104.

Figure 6:
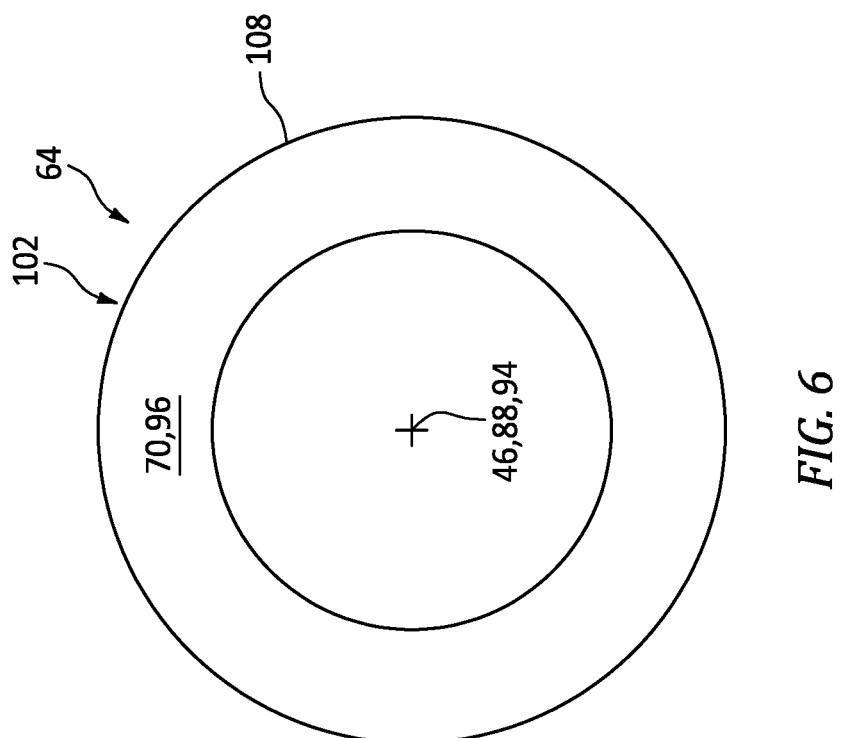
FIG. 6 is a cross-sectional illustration of an inlet section of the exhaust duct.

The inlet section 102 forms the duct inlet 96. The inlet section 102 of FIG. 5 is disposed longitudinally between (a) the turbine section 62/the engine case 66 and (b) the electric machine 30 along the longitudinal centerline 94. Referring to FIG. 6, the inlet section 102 has a (e.g., cross-sectional) annular geometry when viewed, for example, in a reference plane perpendicular to the longitudinal centerline 94 and/or the flowpath 70 at a point of interest along the inlet section 102. The annular geometry of FIG. 6 has a circular shape. This annular geometry may be uniform along a longitudinal length of the inlet section 102. Alternatively, the annular geometry may (e.g., slightly) change along at least a portion of the longitudinal length of the inlet section 102. The present disclosure, however, is not limited to such an exemplary annular shape.

Figure 7:
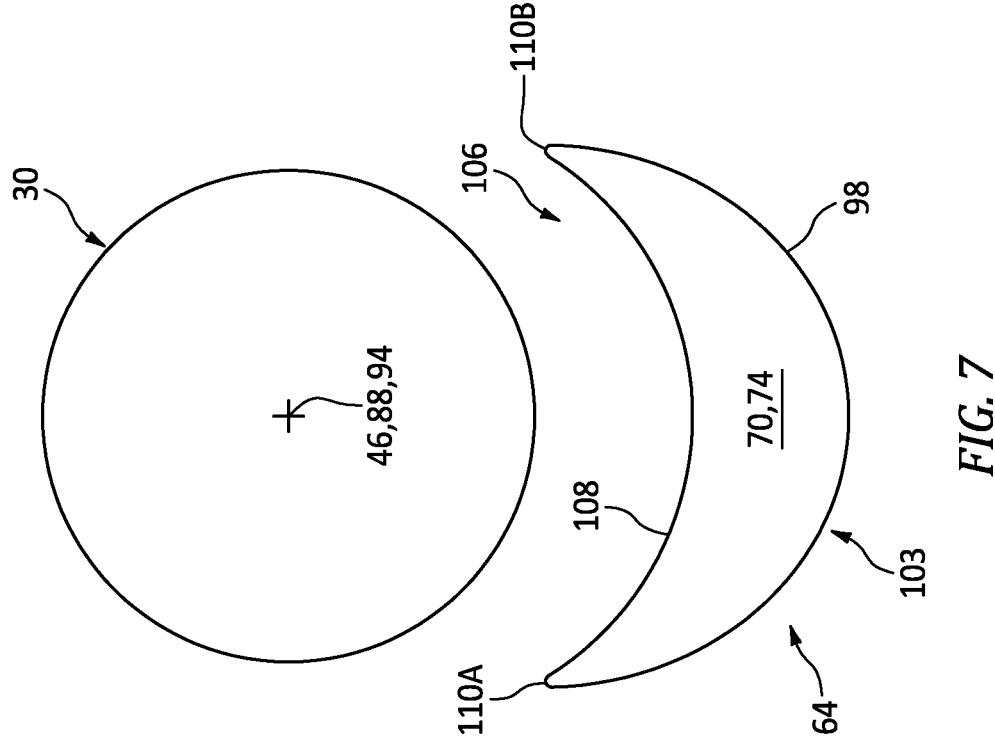
FIG. 7 is a cross-sectional illustration of an outlet section of the exhaust duct with the electric machine (schematically shown).

Referring to FIG. 5, the outlet section 103 forms the duct outlet 98 and the combustion products exhaust 74. The outlet section 103 longitudinally overlaps the electric machine 30 along the longitudinal centerline 94. The outlet section 103 of FIG. 5, for example, extends longitudinally along the electric machine 30 to the combustion products exhaust 74. Referring to FIG. 7, the outlet section 103 has a (e.g., cross-sectional) non-annular geometry when viewed, for example, in a reference plane perpendicular to the longitudinal centerline 94 and/or the flowpath 70 at a point of interest along the outlet section 103. The non-annular geometry of FIG. 7 is an arcuate geometry with, for example, a crescent shape. This non-annular geometry may be uniform along a longitudinal length of the outlet section 103. Alternatively, the non-annular geometry may (e.g., slightly)

change along at least a portion of the longitudinal length of the outlet section 103. The present disclosure, however, is not limited to such an exemplary non-annular geometry. For example, in other embodiments, the non-annular geometry of the outlet section 103 may have a circular segment shape or a polygonal shape.

Figures 8, 9:
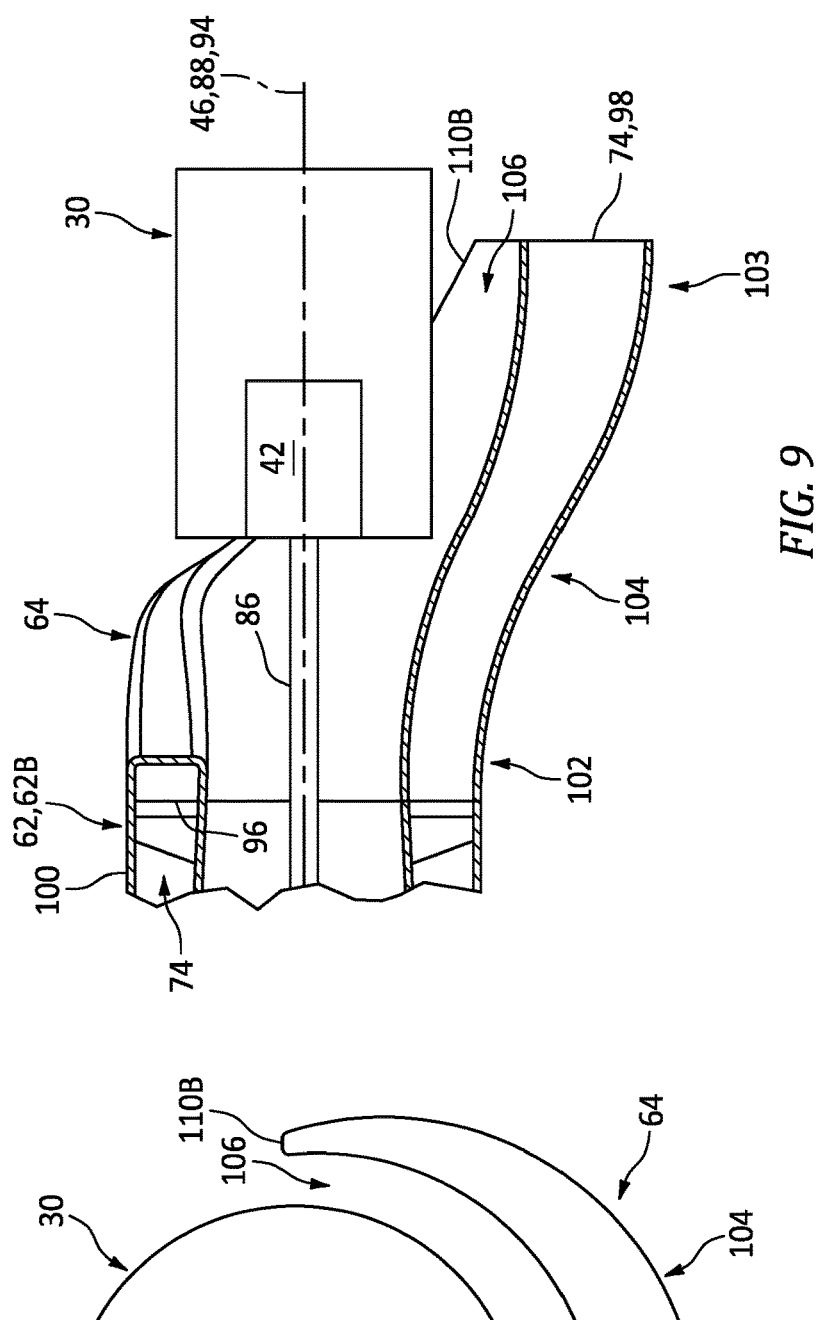
FIG. 8 is a cross-sectional illustration of a transition section of the exhaust duct with the electric machine (schematically shown).
FIG. 9 is a sectional illustration of a portion of the powerplant with the electric machine (schematically shown) and another exhaust duct.

Referring to FIGS. 5 and 6, the transition section 104 connects the outlet section 103 to the inlet section 102. The transition section 104 of FIGS. 5 and 6, for example, extends longitudinally between and to the inlet section 102 and the outlet section 103. The transition section 104 longitudinally overlaps the electric machine 30 along the longitudinal centerline 94. An aft and/or downstream portion of the transition section 104 of FIG. 5, for example, extends longitudinally along the electric machine 30 to the outlet section 103. A forward and/or upstream portion of the transition section 104 of FIG. 5, on the other hand, may be disposed longitudinally between (a) the inlet section 102 and (b) the electric machine 30 along the longitudinal centerline 94. Referring to FIG. 8, the transition section 104 has a (e.g., cross-sectional) non-annular geometry when viewed, for example, in a reference plane perpendicular to the longitudinal centerline 94 and/or the flowpath 70 at a point of interest along the transition section 104. The non-annular geometry of FIG. 8 is an arcuate geometry. This non-annular geometry of the transition section 104 changes along at least a portion or an entirety of a longitudinal length of the transition section 104 to provide a (e.g., gradual) transition between the annular geometry of the inlet section 102 and the non-annular geometry of the outlet section 103.

The exhaust sections 102-104 of FIGS. 4 and 5 are configured to provide the exhaust duct 64 with a side pocket 106, e.g., a groove, an indentation, a recession, a channel, etc. This side pocket 106 is outside of the flowpath 70 and, more particularly, separated from the flowpath 70 by an exterior sidewall 108 of the exhaust duct 64. The side pocket 106 is thereby disposed next to the exhaust duct 64 and its sidewall 108. The electric machine 30 may be arranged at least partially within the side pocket 106. One or more of the duct sections 103 and/or 104 may each extend (e.g., wrap) circumferentially about the electric machine 30 (and the longitudinal centerline 94) between opposing circumferential sides 110A and 110B (generally referred to as "110") of the exhaust duct 64. With this arrangement, the electric machine 30 may be aligned with the gas turbine engine 32 (e.g., the rotational axes 46 and 88 may be at least substantially coaxial). The electric machine 30 may also project (e.g., vertically and/or laterally) out of the side pocket 106 and away from the exhaust duct 64 such that at least a portion of an exterior of the electric machine 30 and its machine case 48 is exposed to air (e.g., relatively cool air, ambient air, etc.) outside of and away from the exhaust duct 64. Such an arrangement may (e.g., significantly) reduce cooling requirements for the electric machine 30. Furthermore, referring to FIG. 5, one or more service lines (e.g., the electrical lead(s) 50 and/or the fluid conduit(s) 58) may be routed to the electric machine 30 without being subject to the relatively hot environment of the exhaust duct 64. The service lines 50, 58 of FIG. 5, for example, may be routed (e.g., directly) to the electric machine 30, for example without passing through (or near) the exhaust duct 64 and/or without passing across the flowpath 70. This may facilitate arranging one or more of the system components 56 (see FIG. 2) remote from the electric machine 30; e.g., outside of the engine case 66 and/or outside of the powerplant 24.

Referring to FIG. 4 (see also FIGS. 7 and 8), the exhaust duct 64 may extend (e.g., wrap) circumferentially around the electric machine 30 less than two-hundred and seventy degrees (270°). The downstream portion of the transition section 104, for example, may extend circumferentially around the electric machine 30 (depending on longitudinal location) between one-hundred and twenty degrees (120°) and two-hundred and seventy degrees (270°); e.g., between one-hundred and sixty degrees (160°) and two-hundred degrees (200°). In another example, the outlet section 103 may extend circumferentially around the electric machine 30 (depending on longitudinal location) between twenty or thirty degrees (20-30°) and one-hundred and sixty degrees (160°); e.g., between forty-five degrees (45°) and one-hundred and twenty degrees (120°).

In some embodiments, referring to FIG. 1, the exhaust duct 64 may follow a non-straight trajectory away from the longitudinal centerline 94. The exhaust duct 64 of FIG. 1, for example, turns away from the electric machine 30 in a vertical downward direction; e.g., relative to gravity when the longitudinal centerline 94 is horizontally level. However, in other embodiments, the exhaust duct 64 may alternatively turn away from the electric machine 30 in a vertical upward direction (e.g., the exhaust duct 64 may be rotated 180° about the longitudinal centerline 94) and/or in a laterally sideways direction (e.g., the exhaust duct 64 may be rotated 90° about the longitudinal centerline 94). In still other embodiments, referring to FIG. 9, the exhaust duct 64 may include a jog to offset the outlet section 103 outward from the inlet section 102 and/or the electric machine 30.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:
   a propulsor rotor;
   an electric machine operatively coupled to and configured to drive rotation of the propulsor rotor; and
   a gas turbine engine operatively coupled to and configured to drive rotation of the propulsor rotor;
   the gas turbine engine including a compressor section, a combustor section, a turbine section, an exhaust duct and a core flowpath extending through the compressor section, the combustor section, the turbine section and the exhaust duct; and
   the exhaust duct extending longitudinally along the electric machine, the exhaust duct extending partially circumferentially about the electric machine between opposing circumferential sides of the exhaust duct, the exhaust duct including a first section and second section, the second section downstream of the first section, the first section extending a first number of degrees about the electric machine between the opposing circumferential sides of the exhaust duct, the second section extending a second number of degrees about the electric machine between the opposing circumferential sides of the exhaust duct, and the second number of degrees is less than the first number of degrees.

2. The aircraft system of claim 1, wherein
   an inlet to the exhaust duct has an annular geometry; and an outlet from the exhaust duct has a non-annular geometry.

3. The aircraft system of claim 2, wherein the non-annular geometry is an arcuate geometry.

4. The aircraft system of claim 2, wherein the non-annular geometry has a crescent shape.

5. The aircraft system of claim 1, wherein an inlet section of the exhaust duct extends circumferentially around a longitudinal centerline; and the inlet section of the exhaust duct is located longitudinally between the turbine section and the electric machine.

6. The aircraft system of claim 1, wherein the first number of degrees is between one-hundred and sixty degrees and two-hundred degrees; and the second number of degrees is between forty-five degrees and one-hundred and twenty degrees.

7. The aircraft system of claim 1, wherein the exhaust duct extends a number of degrees circumferentially about the electric machine between the opposing circumferential sides of the exhaust duct; and the number of degrees is between thirty degrees and two-hundred and seventy degrees.

8. The aircraft system of claim 1, further comprising one or more service lines routed to the electric machine without passing through the exhaust duct.

9. The aircraft system of claim 1, wherein a rotational axis of the electric machine is coaxial with a rotational axis of the gas turbine engine.

10. The aircraft system of claim 1, wherein the gas turbine engine further includes a rotating structure rotatable with and coupled to the propulsor rotor; and the electric machine comprises an electric machine rotor rotatable with and coupled to the propulsor rotor through the rotating structure.

11. The aircraft system of claim 10, wherein the rotating structure comprises a turbine rotor arranged within the turbine section.

12. The aircraft system of claim 10, further comprising a geartrain coupling the rotating structure to the propulsor rotor.

13. The aircraft system of claim 1, wherein the electric machine is configurable as an electric motor during a motor mode of operation to drive rotation of the propulsor rotor; and the electric machine is further configurable as an electric generator during a generator mode of operation where the gas turbine engine is configured to drive rotation of an electric machine rotor within the electric machine.

14. The aircraft system of claim 1, wherein the propulsor rotor comprises a propeller rotor.

15. The aircraft system of claim 1, wherein the exhaust duct has a side pocket outside of the core flowpath, and wherein the side pocket is a groove, an indentation, a recession, or a channel.

16. An aircraft system, comprising:

an electric machine comprising an electric machine rotor; and a gas turbine engine including a rotating structure, a compressor section, a combustor section, a turbine section, an exhaust duct and a core flowpath extending through the compressor section, the combustor section, the turbine section and the exhaust duct;

the rotating structure comprising a turbine rotor within the turbine section, and the rotating structure rotatable with and coupled to the electric machine rotor; and the exhaust duct wrapped partially circumferentially around the electric machine, the exhaust duct extending axially from a first section towards a second section, the second section downstream of the first section, the first section extending a first number of degrees about the electric machine between opposing circumferential sides of the exhaust duct, the second section extending a second number of degrees about the electric machine between the opposing circumferential sides of the exhaust duct, and the second number of degrees is less than the first number of degrees.

17. The aircraft system of claim 16, wherein at least a section of the exhaust duct wraps between thirty degrees and two-hundred and seventy degrees circumferentially around the electric machine; and the section of the exhaust duct longitudinally overlaps the electric machine.

18. The aircraft system of claim 16, further comprising a propulsor rotor rotatable with and coupled to the electric machine rotor through the rotating structure.

19. An aircraft system, comprising:

an electric machine comprising an electric machine rotor, the electric machine extending axially along an axis;

a gas turbine engine including a rotating structure, a compressor section, a combustor section, a turbine section, an exhaust duct and a core flowpath extending through the compressor section, the combustor section, the turbine section and the exhaust duct;

the rotating structure comprising a turbine rotor within the turbine section, and the rotating structure rotatable with and coupled to the electric machine rotor;

the exhaust duct extending longitudinally along the electric machine, the exhaust duct including a first section and second section, the first section extending a first number of degrees about the electric machine between opposing circumferential sides of the exhaust duct, and the second section extending a second number of degrees about the electric machine between the opposing circumferential sides of the exhaust duct; and one or more service lines routed to the electric machine without passing through the exhaust duct or across the core flowpath;

wherein the first number of degrees is between one-hundred and sixty degrees and two-hundred degrees, and the second number of degrees is between forty-five degrees and one-hundred and twenty degrees; and wherein the exhaust duct extends in a non-straight trajectory away from the axis.

* * * * *